US008433906B2

(12) United States Patent
Jamjoom et al.

(10) Patent No.: US 8,433,906 B2
(45) Date of Patent: Apr. 30, 2013

(54) METHOD AND SYSTEM FOR MICROLOCKING WEB CONTENT

(75) Inventors: Hani T. Jamjoom, Hawthorne, NY (US); Debanjan Saha, Mohegan Lake, NY (US); Sambit Sahu, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 305 days.

(21) Appl. No.: 12/787,688

(22) Filed: May 26, 2010

(65) Prior Publication Data

US 2011/0296177 A1 Dec. 1, 2011

(51) Int. Cl.
*H04L 9/32* (2006.01)
(52) U.S. Cl.
USPC .............................. 713/168; 705/52; 709/223
(58) Field of Classification Search .................. 709/223; 713/168; 726/30
See application file for complete search history.

(56) References Cited

U.S. PATENT DOCUMENTS

| 7,467,198 B2* | 12/2008 | Goodman et al. ............ 709/223 |
| 2004/0254887 A1* | 12/2004 | Jacoby ............................ 705/52 |

* cited by examiner

*Primary Examiner* — Nathan Flynn
*Assistant Examiner* — Phuoc Tran
(74) *Attorney, Agent, or Firm* — Scully, Scott, Murphy & Presser, P.C.; Daniel P. Morris, Esq.

(57) ABSTRACT

A method and system for ensuring the authenticity of server returned information displayed at a client browser is provided. The method comprises receiving the server returned information at a client computer; storing a copy of the server returned information at the client computer; inspecting the server returned information for one or more locked objects; allowing the client browser to operate one or more client installed scripts; inspecting the server returned information for any modifications to the one or more locked objects; and in response to determining that the one or more client installed scripts have made modifications to the one or more locked objects, replacing the modified locked objects with unmodified versions of the locked objects from the stored copy of the server returned information.

20 Claims, 4 Drawing Sheets

METHOD AND SYSTEM FOR MICROLOCKING WEB CONTENT

BACKGROUND

The present invention relates generally to the rendering of web pages, and more specifically to securing objects on a rendered web page.

Client installed scripts (CIS) are a class of computer programs run on a client computer by a web browser to modify web pages and user interactions with web pages provided to the client computer from a web server. After a user requests a web page from the web server, the client installed script intercepts the web page and makes modifications to the HyperText Markup Language (HTML) or Dynamic HyperText Markup Language (DHTML) behind the web page and then presents the modified web page to the client web browser for rendering. Client installed scripts may contain instructions for the browser to follow if the user interacts with the document in a certain way, e.g., entering a username or a password. These instructions can be followed without further communication with the web server or interaction on the user's behalf.

A popular client installed script is GREASEMONKEY. GREASEMONKEY allows users to install client scripts that render changes to a web page every time the web page is loaded. CIS can be used for adding new functions to web pages such as fixing rendering bugs, removing specific content, such as advertising and popups, adding links, buttons, and other HTML elements to a web page, combining data from multiple web pages, etc. These scripts manipulate the content of a web page via the Document Object Model (DOM) interface.

Client installed scripts may also exhibit malicious behavior. That is, some CIS may be programmed as malware for the express purpose of comprising user names and passwords, or for stealing other sensitive information from a user. Client installed scripts can be easily programmed to surreptitiously record user information and pass this user information to another computer without the consent of the user.

Thus, there is a need in the art for a software program or method that prevents client installed scripts from exhibiting malicious behavior and compromising sensitive user information.

SUMMARY

A method and system for ensuring the authenticity of server returned information displayed at a client browser is provided. In one embodiment, the method comprises receiving the server returned information at a client computer; storing a copy of the server returned information at the client computer; inspecting the server returned information for one or more locked objects; allowing the client browser to operate one or more client installed scripts; inspecting the server returned information for any modifications to the one or more locked objects; and in response to determining that the one or more client installed scripts have made modifications to the one or more locked objects, replacing the modified locked objects with unmodified versions of the locked objects from the stored copy of the server returned information.

The system comprises a client computer coupled to a web server via a network, the client computer comprising a memory and a processor operable to run security software that intercepts server returned information at the client computer, stores a copy of the server returned information at the client computer, inspects the server returned information for one or more locked objects, allows the client browser to execute one or more client installed scripts, inspects the server returned information for any modifications to the one or more locked objects, and in response to determining that the one or more client installed scripts have made modifications to the one or more locked objects, replaces the modified objects with unmodified versions of the objects from the stored copy of server returned information.

A computer readable storage medium implementing the method is also provided.

DETAILED DESCRIPTION

Figure 1:
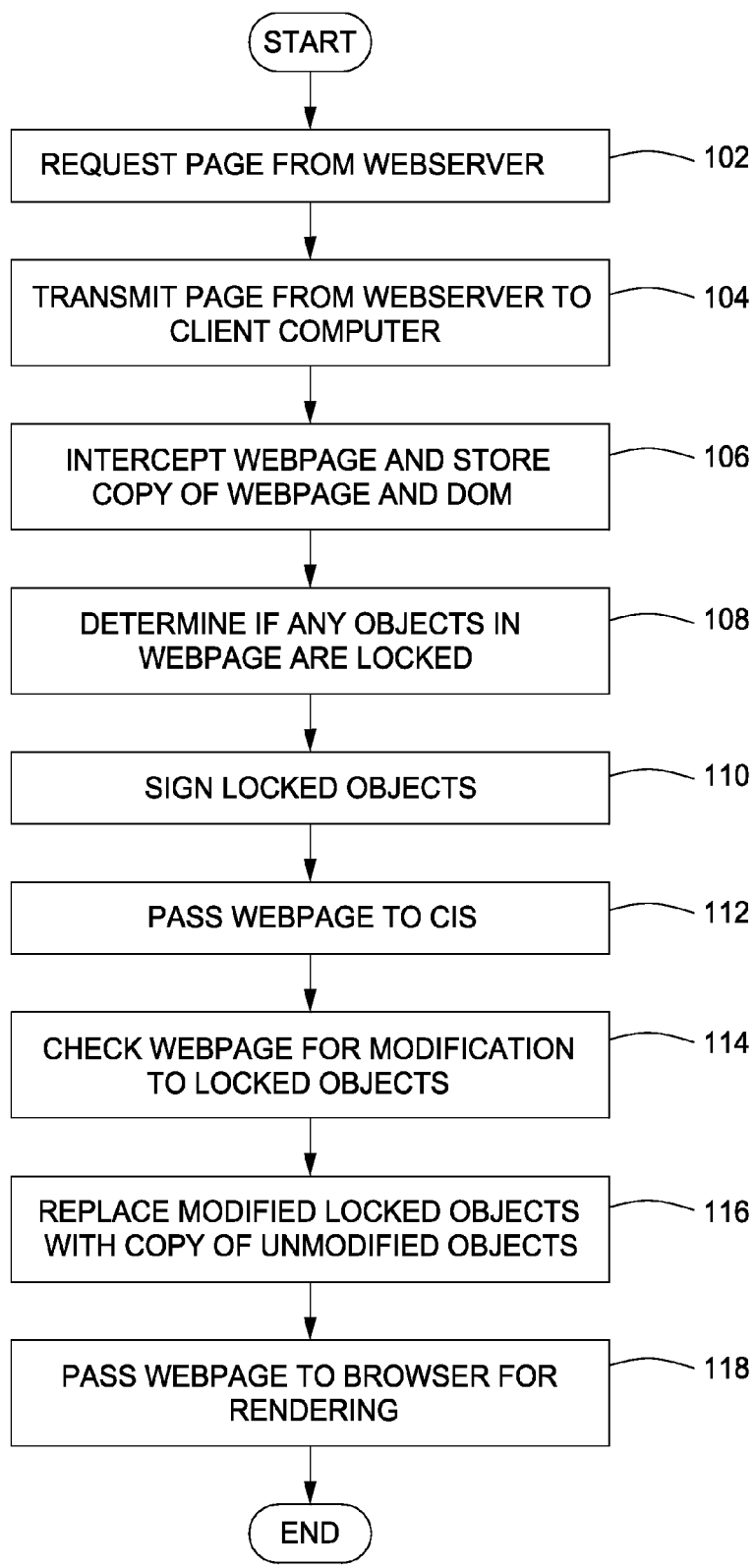
FIG. 1 is one embodiment of a method for micro-locking web content in accordance with the present invention.

FIG. 1 is one embodiment of a method for micro-locking web content in accordance with the present invention. The method begins at step 102 when a client computer requests a web page from a web server through a HyperText Transfer Protocol (HTTP) request. At step 104, the web server responds to the request and transmits the web page to the client computer. At step 106, security software on the client computer intercepts the web page and stores an original copy of the web page and its document object model (DOM) to memory or another storage location, such as a hard drive, for retrieval at a later time. The stored copy may be used by the security software to restore the web page to its original form or function if a client installed script (CIS) attempts to perform a malicious action or otherwise compromise the security of the original web page in an unwanted manner.

At step 108, the security software examines the web page and determines if any of the objects are 'locked' or 'secured' objects that should not be replaced or modified in any way by a CIS. Examples of objects that may be locked include username or login objects, password objects, credit card objects, and objects that accept personal or financial information from a user as inputs. In one embodiment, an object may be locked by insertion of an HTML tag that indicates the object is a locked object. In one embodiment, the locked object is 'signed' by the security software. A 'signed' object is locked but still visible to the CIS. At step 110, the security software 'signs' all of the locked objects. In one embodiment, the locked objects are signed by computation of a hash or checksum, such as an MD5 hash, for the object before the object is operated upon by the CIS. The security software stores and maintains checksums for all of the locked objects prior to operation of the CIS.

At step 112, the security software passes the web page to any client installed scripts for content modification. The CIS makes modifications to the content of the web page such as fixing rendering bugs, and adding or removing specific content. At step 114, the security software rechecks the web page for any modifications made to the 'locked' or 'secured' objects by the CIS. The security software recalculates the checksum for all of the locked objects after the operation of the CIS. Any change in the checksum for a locked object is an indication that the CIS has made a change to the locked object.

At step 116, any locked objects that were modified by the CIS are replaced by the security software with an original copy of the object prior to modification. This is possible because the security software stores a copy of the web page and the DOM skeleton before the CIS modifies the web page. At step 118, the security software passes the web page to a web browser, and the web browser renders the web page to the user. The locked objects remain in place, unmodified and presented to the user as originally programmed. Only unlocked or unsecured objects are modified by the CIS.

Figure 2:
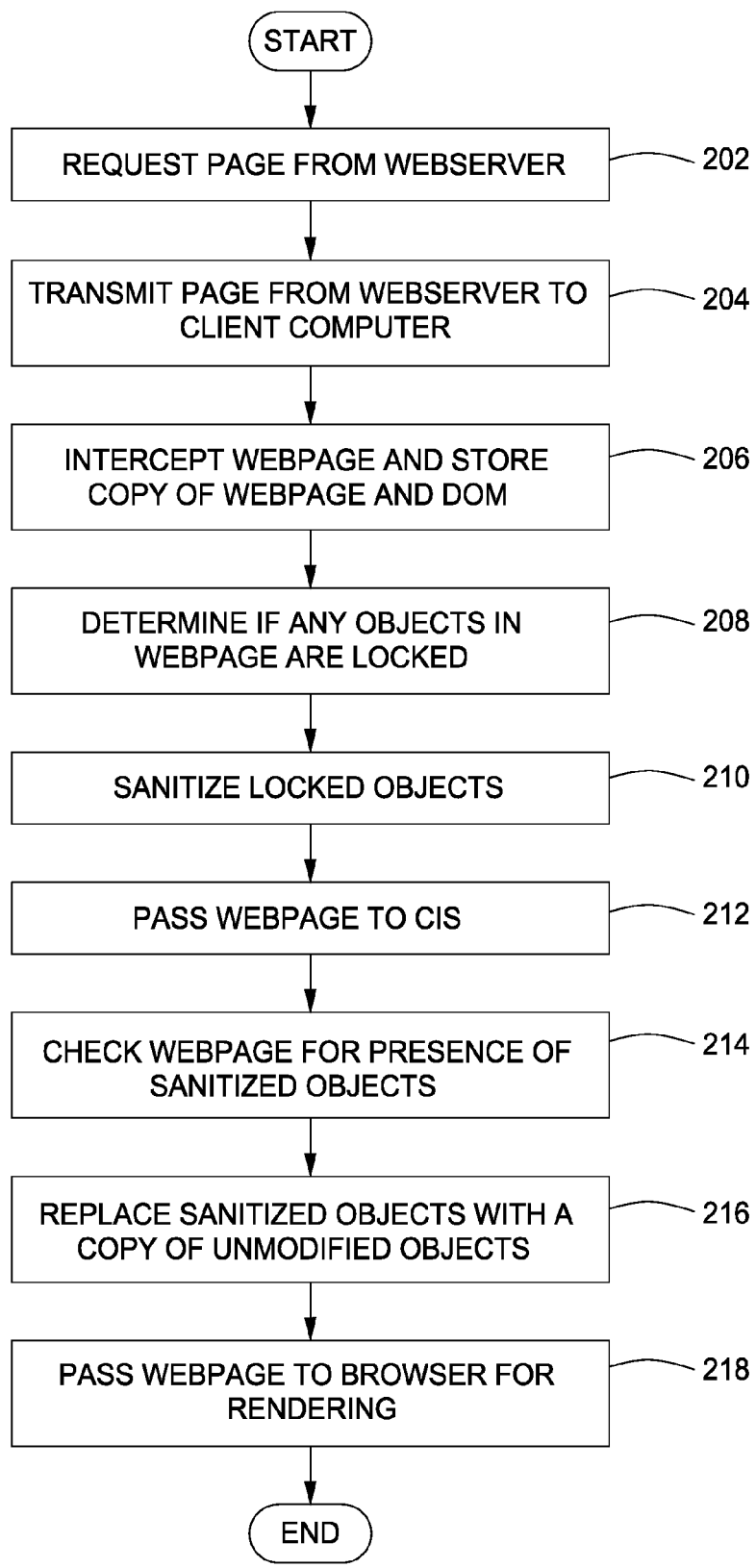
FIG. 2 is one embodiment of a method for micro-locking web content in accordance with the present invention.

FIG. 2 is another embodiment of a method for micro-locking web content in accordance with the present invention. The method begins at step 202 when a client computer requests a web page from a web server through an HTTP request. At step 204, the web server responds to the request and transmits the web page to the client computer. At step 206, security software on the client computer intercepts the web page and stores an original copy of the web page and its document object model (DOM) to memory or another storage location, such as a hard drive, for retrieval at a later time. The stored copy may be used by the security software to restore the web page to its original form or function if a client installed script (CIS) attempts to perform a malicious action or otherwise compromise the security of the original web page in an unwanted manner.

At step 208, the security software examines the web page and determines if any of the objects are 'locked' or 'secured' objects that should not be replaced or modified in any way by a CIS. In one embodiment, an object may be locked by insertion of an HTML tag that indicates the object is a locked object. In one embodiment, the locked object is 'sanitized' by the security software. A 'sanitized' object is locked and invisible to the CIS. At step 210, the security software 'santizes' all of the locked objects by removing the locked objects from the web page's HTML code and replacing the object with a reference tag or place holder. In another embodiment, the security software 'santizes' all of the locked objects by encrypting the locked objects within the web page's HTML code. The end result is that the CIS is unable to read and interpret the content of the locked object, hence the locked object is effectively invisible to the CIS.

At step 212, the security software passes the web page to any client installed scripts for content modification. The CIS makes modifications to the content of the web page such as fixing rendering bugs, and adding or removing specific content. At step 214, the security software checks the web page for the presence of any reference or placeholder tags that indicate a locked object was sanitized from the HTML code. In another embodiment, the security software checks the web page for the presence of any encrypted locked objects.

At step 216, any locked objects that were sanitized by the security software are replaced by the security software with an original copy of the object. Reference tags and place holders that were substituted for locked objects are replaced by the original object. Encrypted objects are decrypted and restored to their original state. This is possible because the security software stores a copy of the web page and the DOM skeleton before the CIS modifies the web page. At step 218, the security software passes the web page to a web browser, and the web browser renders the web page to the user. The locked objects remain in place, unmodified and presented to the user as originally programmed.

Figure 3:
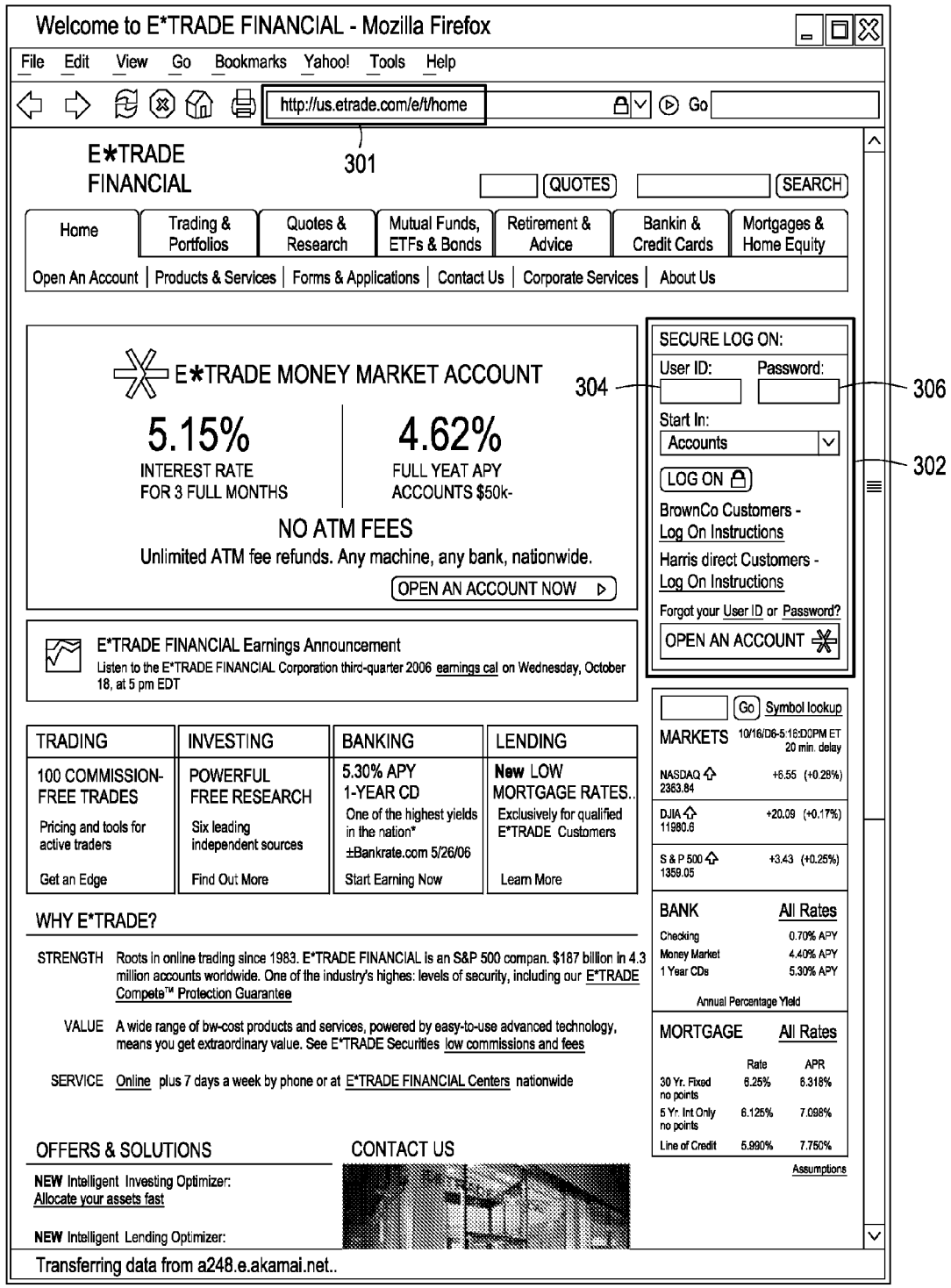
FIG. 3 is an example of a web page which can benefit from the present invention.

FIG. 3 is an example of a web page which can benefit from the present invention. The web page is a secured web page as noted by the 'HTTPS' designation 301 in the URL identifier. An area of the web page is designated as a secure area 302. The secure area 302 cannot be modified by any CIS and must appear on the web page as specified without any changes or modifications to the objects within the secure area 302. The secure area 302 comprises a 'username' input box 304 and a 'password' input box 306. The username input box 304 accepts a user identification and the password input box 306 accepts a password. Both of these input boxes 304 and 306 are also 'locked' or 'secured' boxes and cannot be changed or modified by a CIS. Locking the objects within a secured area prevents a CIS from intercepting a user's keystrokes or mouse clicks within the secured area and maliciously transmitting the user's information to another computer.

Figure 4:
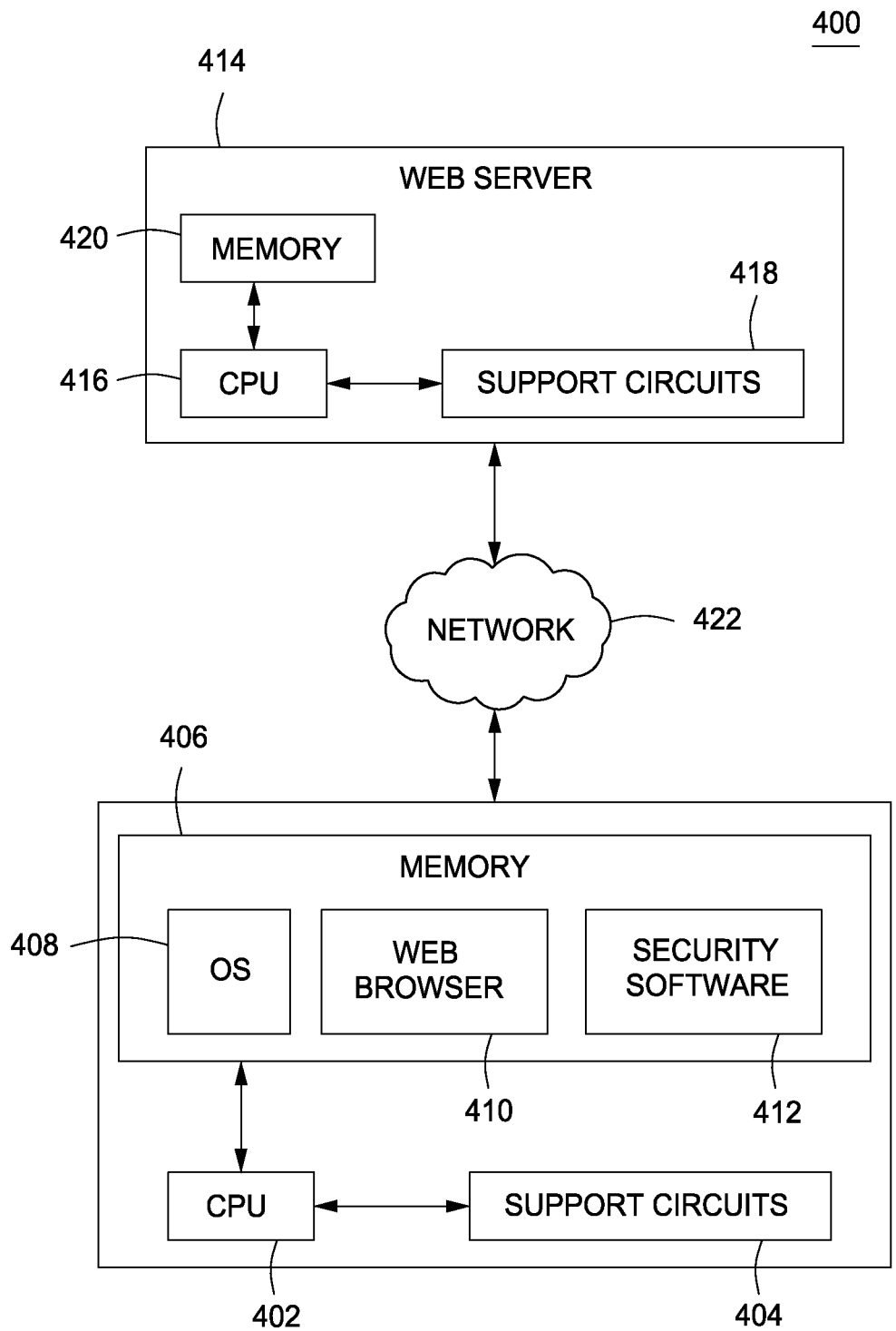
FIG. 4 is an example of a computing environment in which the present invention can be implemented.

FIG. 4 is an example of a computing environment in which the present invention may be implemented. A client computer 400 is connected to a web server 414 via a network 422. The network 422 is any network capable of facilitating computing devices, such as the Internet or Ethernet. The client computer 400 is any computing device, such as a desktop or laptop computer.

The client computer comprises a processor (CPU) 402, support circuits 404 and a memory 406. The processor 402 is interconnected to the support circuits 404 and the memory 406. The processor 402 runs instructions and programs stored in the memory 406, such as an operating system (OS) 408, a web browser 410 and security software 412. The support circuits 404 include input/output (I/O) circuits, clocks, power supply circuits and network interface circuits. The support circuits 404 facilitate communication between the client computer 400 and the web server 414.

The memory 406 may include random access memory, read only memory, removable disk memory, flash memory, and various combinations of these types of memory. The memory 406 is sometimes referred to as a main memory and may in part be used as cache memory. The memory 406 stores the operating system (OS) 408, the web browser 410 and the security software 412. The web browser 410 may be any web browser, such as INTERNET EXPLORER™, FIREFOX™, SAFARI™ or GOOGLE CHROME™. In one embodiment, the security software 412 is implemented as a plug-in application to a web browser and utilizes the methods described above in FIGS. 1 and 2. The security software 412 may also be added to the underlying code of a web browser.

The web server 414 comprises a processor (CPU) 416, support circuits 418 and a memory 420. The function of the web server 414 is to provide web pages to the client computer 400 via the network 422. The web server 414 accepts HTTP or other web page requests from the client computer 400 and provides the web page or another appropriate response to the client computer. The web server 414 may also be a group of web servers. For simplicity, only one client computer 400 and one web server 414 are depicted.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a 'circuit,' 'module' or 'system.' Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction operation system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction operation system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the 'C' programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIGS. 1 through 4. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be operated substantially concurrently, or the blocks may sometimes be operated in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

What is claimed is:

1. A method to ensure authenticity of server returned information at a client browser comprising:
   receiving the server returned information at a client computer;
   storing a copy of the server returned information at the client computer;
   inspecting the server returned information for one or more locked objects;
   allowing the client browser to operate one or more client installed scripts;
   inspecting the server returned information for any modifications to the one or more locked objects; and
   in response to determining that the one or more client installed scripts have made modifications to the one or more locked objects, replacing the modified locked objects with unmodified versions of the locked objects from the stored copy of the server returned information.

2. The method of claim 1, wherein the server returned information comprises one or more web pages.

3. The method of claim 2, wherein the client computer stores a document object model skeleton for the one or more web pages.

4. The method of claim 1, further comprising:
   calculating a first checksum for each of the one or more locked objects; and calculating a second checksum for each of the one or more locked objects after operation of the one or more client installed scripts, wherein the step of inspecting further comprises comparing the first checksum to the second checksum.

5. The method of claim 1, further comprising:
replacing each of the one or more locked objects with a corresponding reference tag; and
after operation of the one or more client installed scripts, replacing each of the corresponding reference tags with unmodified versions of the locked objects from the stored copy of the server returned information.

6. The method of claim 1, further comprising:
replacing each of the one or more locked objects with a corresponding encrypted version of the one or more locked objects; and
after operation of the one or more client installed scripts, replacing each of the corresponding encrypted versions with unmodified versions of the locked objects from the stored copy of the server returned information.

7. The method of claim 1, wherein the one or more locked objects comprise at least one of a username, a password, a credit card number, a social security number, personal identification number.

8. A system for ensuring authenticity of server returned information at a client browser, the system comprising a client computer coupled to a web server via a network, the client computer comprising a memory and a processor operable to run security software that intercepts server returned information at the client computer, stores a copy of the server returned information at the client computer, inspects the server returned information for one or more locked objects, allows the client browser to operate one or more client installed scripts, inspects the server returned information for any modifications to the one or more locked objects, and in response to determining that the one or more client installed scripts have made modifications to the one or more locked objects, replaces the modified objects with unmodified versions of the objects from the stored copy of server returned information.

9. The system of claim 8, wherein the server returned information comprises one or more web pages.

10. The system of claim 9, wherein the client computer stores a document object model skeleton for the one or more web pages.

11. The system of claim 8, wherein the processor is further operable to calculate a first checksum for each of the one or more locked objects,
calculate a second checksum for each of the one or more locked objects after operation of the one or more client installed scripts, and compare the first checksum to the second checksum to determine if the one or more client installed scripts have made any modifications to the one or more locked objects.

12. The system of claim 8, wherein the processor is further operable to replace each of the one or more locked objects with a corresponding reference tag, and
after operation of the one or more client installed scripts, replace each of the corresponding reference tags with unmodified versions of the locked objects from the stored copy of the server returned information.

13. The system of claim 8, wherein the processor is further operable to replace each of the one or more locked objects with a corresponding encrypted version of the one or more locked objects, and after operation of the one or more client installed scripts, replace each of the corresponding encrypted versions with unmodified versions of the locked objects from the stored copy of the server returned information.

14. The system of claim 8, wherein the one or more locked objects comprise at least one of a username, a password, a credit card number, a social security number, personal identification number.

15. A computer program product for ensuring authenticity of server returned information at a client browser comprising:
a storage medium readable by a processor and storing instructions for operation by the processor for performing a method comprising:
receiving the server returned information at a client computer;
storing a copy of the server returned information at the client computer;
inspecting the server returned information for one or more locked objects;
allowing the client browser to operate one or more client installed scripts;
inspecting the server returned information for any modifications to the one or more locked objects; and
in response to determining that the one or more client installed scripts have made modifications to the one or more locked objects, replacing the modified locked objects with unmodified versions of the locked objects from the stored copy of the server returned information.

16. The computer program product of claim 15, wherein the server returned information comprises one or more web pages.

17. The computer program product of claim 16, wherein the client computer stores a document object model skeleton for the one or more web pages.

18. The computer program product of claim 15, further comprising:
calculating a first checksum for each of the one or more locked objects; and
calculating a second checksum for each of the one or more locked objects after operation of the one or more client installed scripts, wherein the step of inspecting further comprises comparing the first checksum to the second checksum.

19. The computer program product of claim 15, further comprising:
replacing each of the one or more locked objects with a corresponding reference tag; and
after operation of the one or more client installed scripts, replacing each of the corresponding reference tags with unmodified versions of the locked objects from the stored copy of the server returned information.

20. The computer program product of claim 15, further comprising:
replacing each of the one or more locked objects with a corresponding encrypted version of the one or more locked objects; and
after operation of the one or more client installed scripts, replacing each of the corresponding encrypted versions with unmodified versions of the locked objects from the stored copy of the server returned information.

* * * * *